(12) United States Patent
Wu et al.

(10) Patent No.: US 10,763,580 B2
(45) Date of Patent: Sep. 1, 2020

(54) REAL-TIME DATA TRANSMISSION SYSTEM

(71) Applicant: PSJ INTERNATIONAL LTD., Tortola (VG)

(72) Inventors: Ruey-Beei Wu, Taipei (TW); Shau-Gang Mao, Taipei (TW)

(73) Assignee: PSJ INTERNATIONAL LTD., Tortola (VG)

( * ) Notice: Subject to any disclaimer, the term of this patent is extended or adjusted under 35 U.S.C. 154(b) by 227 days.

(21) Appl. No.: 15/936,536

(22) Filed: Mar. 27, 2018

(65) Prior Publication Data

US 2018/0294563 A1  Oct. 11, 2018

(30) Foreign Application Priority Data

Apr. 7, 2017 (TW) .............................. 106204828 U

(51) Int. Cl.
| | |
|---|---|
| H01Q 3/20 | (2006.01) |
| H01Q 21/29 | (2006.01) |
| H01Q 21/28 | (2006.01) |
| H01Q 21/06 | (2006.01) |
| H01Q 5/50 | (2015.01) |
| B64C 39/00 | (2006.01) |
| H01Q 1/28 | (2006.01) |

(52) U.S. Cl.
CPC .............. H01Q 3/20 (2013.01); H01Q 21/065 (2013.01); H01Q 21/28 (2013.01); H01Q 21/29 (2013.01); B64C 39/00 (2013.01); B64C 2201/146 (2013.01); H01Q 1/28 (2013.01); H01Q 5/50 (2015.01)

(58) Field of Classification Search
CPC ... B64C 39/00; B64C 2201/146; A63H 27/00; H01Q 3/005; H01Q 3/02; H01Q 3/04; H01Q 3/06; H01Q 3/08
See application file for complete search history.

(56) References Cited

U.S. PATENT DOCUMENTS

| | | | |
|---|---|---|---|
| 2015/0116155 A1* | 4/2015 | Chibane | H01Q 1/1257 342/372 |
| 2017/0003680 A1* | 1/2017 | Wang | G05D 1/0022 |
| 2017/0039860 A1* | 2/2017 | Just | H01Q 21/28 |
| 2017/0102460 A1* | 4/2017 | Harris | G01S 13/72 |

* cited by examiner

*Primary Examiner* — Daniel Munoz
(74) *Attorney, Agent, or Firm* — Li & Cai Intellectual Property (USA) Office

(57) ABSTRACT

A real-time data transmission system includes an aerial device and a base station. The aerial device has a first antenna module transmitting data in a frequency band with wide-bandwidth and high-speed transmission characteristics. The base station includes a second antenna module configured to receive data from the first antenna module of the aerial device in the frequency band. The radiation direction of the second antenna is adjustable in accordance with the position of the aerial device.

13 Claims, 5 Drawing Sheets

REAL-TIME DATA TRANSMISSION SYSTEM

The instant disclosure relates to a data transmission system, and more particularly, to a real-time data transmission system.

BACKGROUND

In the current field of communications, it is difficult for the efficiency of data transmission in communication frequency bands to be significantly improved. For example, high-definition image data can generally only be obtained by a camera module with a large storage device. Otherwise, if the image data is transmitted by wireless communication, a lot of time would be wasted. In addition, when high-altitude photography is performed, it cannot be immediately determined whether the captured image data is appropriate. If the captured image data is does not meet user requirements, then the high-altitude photograph would need to be performed again, increasing the costs associated therewith.

Therefore, it is an important issue in the industry to provide a real-time data transmission system.

SUMMARY

A real-time data transmission system is provided in the present disclosure. The real-time data transmission system includes an aerial device and a base station. The aerial device has a first antenna module. The aerial device transmits data in a frequency band with wide-bandwidth and high-speed transmission characteristics via the first antenna module. The base station includes a second antenna module configured to receive the data from the first antenna module of the aerial device in the frequency band. The radiation direction of the second antenna is adjustable in accordance with the position of the aerial device.

According to the above, the first antenna module is used for transmitting data to the base station via the first frequency band with wide-bandwidth and high-speed transmission characteristics. The base station can be directed toward the aerial device according to the three-dimensional position information of the aerial device. Therefore, the capacity of a storage device used in the aerial device can be reduced, and the data stored in the aerial device can be transmitted, received and viewed instantly, thereby effectively saving time and equipment costs for the user.

For further understanding of the instant disclosure, reference is made to the following detailed description illustrating the embodiments and examples of the instant disclosure. The description is only for illustrating the instant disclosure, not for limiting the scope of the claim.

BRIEF DESCRIPTION OF THE DRAWINGS

Embodiments are illustrated by way of example and not by way of limitation in the figures of the accompanying drawings, in which like references indicate similar elements and in which.

DETAILED DESCRIPTION OF EMBODIMENTS

The aforementioned illustrations and following detailed descriptions are exemplary for the purpose of further explaining the scope of the instant disclosure. Other objectives and advantages related to the instant disclosure will be illustrated in the subsequent descriptions and appended drawings. The following description is going to illustrate a task supervising system and a method thereof provided by the instant disclosure with figures; however, it is not restricted by the embodiments below.

It will be understood that, although the terms first, second, third, and the like, may be used herein to describe various elements, components, regions, layers and/or sections, these elements, components, regions, layers and/or sections should not be limited by these terms. These terms are only to distinguish one element, component, region, layer or section from another region, layer or section discussed below could be termed a second element, component, region, layer or section without departing from the teachings of the instant disclosure. As used herein, the term "and/or" includes any and all combinations of one or more of the associated listed items.

One Embodiment of the Present Disclosure

Figure 1:
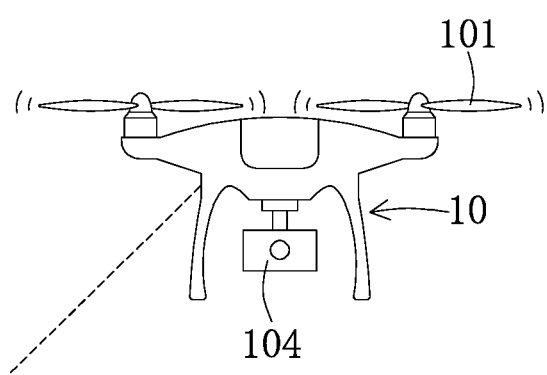
FIG. 1 is a schematic diagram of a real-time data transmission system according to an embodiment of the present disclosure.
Figure 1:
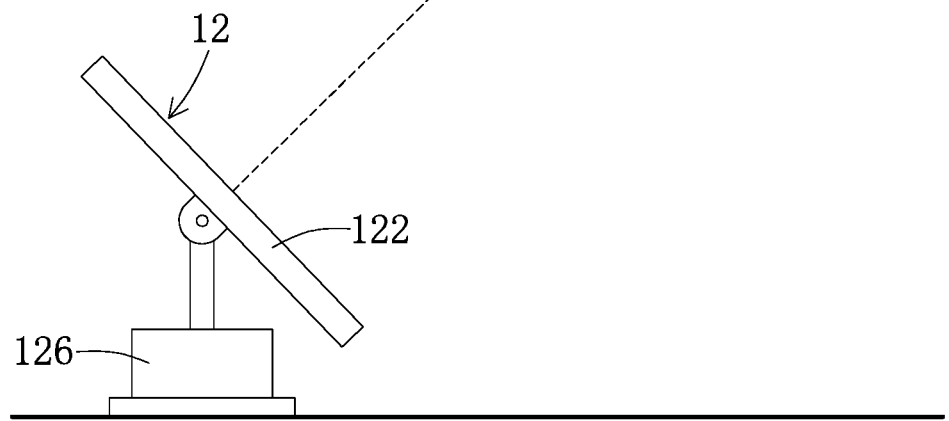
Figure 2:
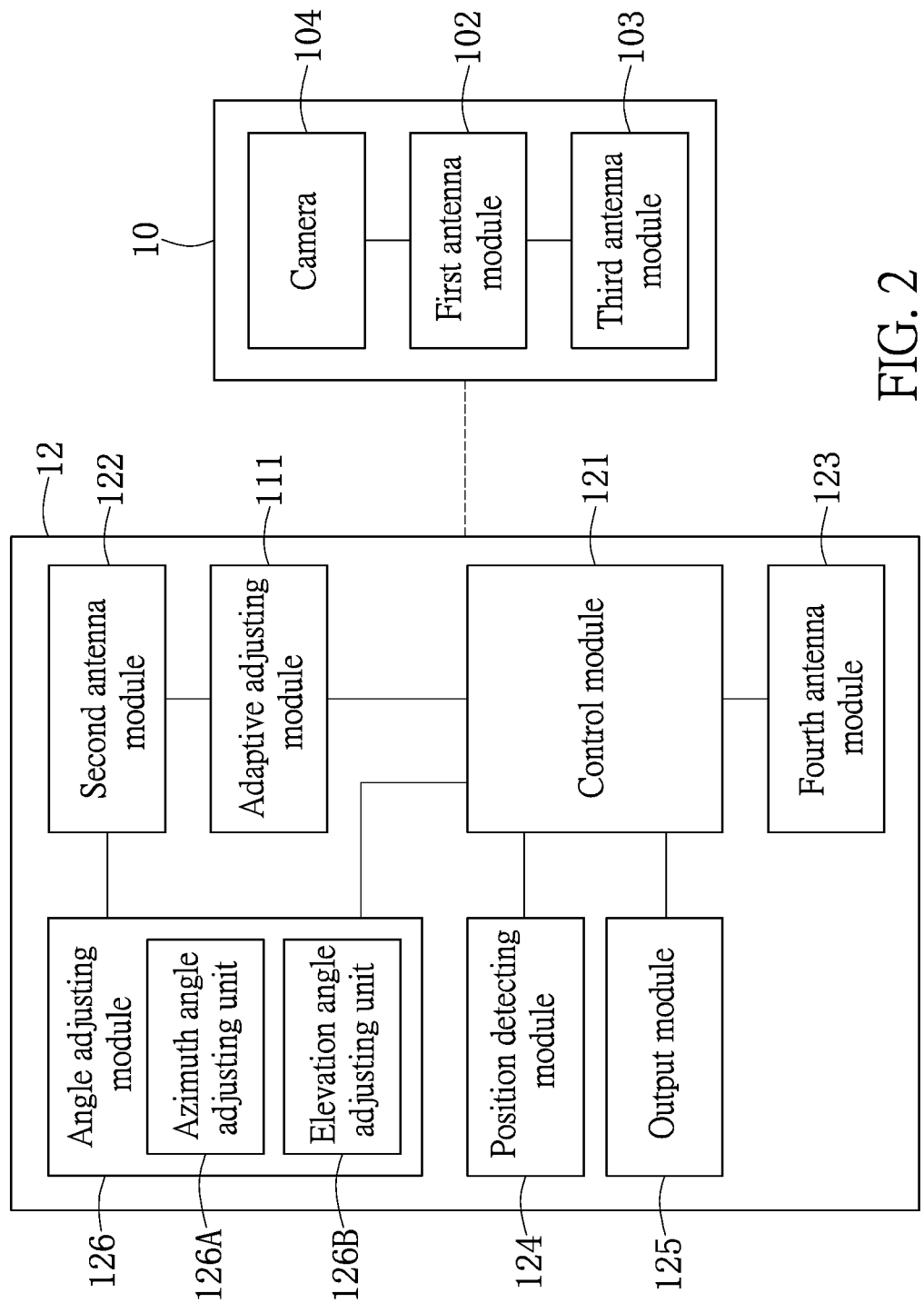
FIG. 2 is another functional block diagram of the real-time data transmission system according to the embodiment of the present disclosure.

Reference is made to FIG. 1 and FIG. 2. FIG. 1 is a schematic diagram of a real-time data transmission system according to the embodiment of the present disclosure. FIG. 2 is a functional block diagram of a real-time data transmission system according to the embodiment of the present disclosure.

In this embodiment, the real-time data transmission system 1 includes at least one aerial device 10 and a base station 12. The aerial device 10 includes at least one propeller 101, a first antenna module 102, a third antenna module 103 and a camera 104. In the embodiment, the aerial device 10 can fly at a predetermined height and obtain at least one image data with the camera 104. The aerial device 10 further transmits the image data to the base station 12 in a frequency band with wide-bandwidth and high-speed transmission characteristics via the first antenna module 102. In the embodiment, the number of the aerial device is one. In other embodiments, the number of the aerial device can be two or more, and is not limited in the present disclosure.

In the present embodiment, the first antenna module 102 of the aerial device 10 is used for transmitting or receiving signals of a first frequency band. The first frequency band is the frequency band with wide-bandwidth and high-speed transmission characteristics as in the above description. That is to say, the image data taken by the camera 104 is transmitted in the first frequency band. In the embodiment, the first frequency band is at millimeter frequencies or microwave frequencies, and the first antenna module 102 is a millimeter or microwave antenna. The third antenna module 103 of the aerial device 10 is used for transmitting or receiving signals of a second frequency band. In the embodiment, the second frequency band is a frequency band of a Wi-Fi channel, such as 2.4 GHz or 5 GHz. The second frequency band can be designed according to practical requirements, and is not limited in the present disclosure.

Since the first frequency band used by the aerial device 10 and the base station 12 of the present embodiment is the millimeter wave band, the aerial device 10 can take photographs or record videos of high definition using the camera 104, and transmit the high-definition image data to the base station 12.

The base station 12 includes a control module 121, a second antenna module 122, a fourth antenna module 123 and a position detecting module 124. The control module 121 is in signal connection with the second antenna module 122, the fourth antenna module 123, and the position detecting module 124. In this embodiment, the second antenna module 122 is a directional antenna; however, the present disclosure is not limited thereto. The second antenna module 122 of the base station 12 is used for transmitting or receiving signals of the first frequency band, e.g. the image data sent from the first antenna module 102, in which the first frequency band is the frequency band with wide-bandwidth and high-speed transmission characteristics (millimeter or microwave wave band).

The position detecting module 124 is used for detecting the current position of the base station 12. In the embodiment, the position detecting module 124 is a global positioning system module. Namely, the position detecting module 124 detects the global positioning system information of the base station 12, which includes longitude information, latitude information, and height information of the base station 12. In this embodiment, the radiation direction of the second antenna module 122 of the base station 12 is adjustable in accordance with the position of the aerial device 10.

More specifically, as shown in FIG. 2, the base station 12 further includes an angle adjusting module 126 connected between the second antenna module 122 and the control module 121, and configured to adjust a radiation direction of the second antenna module 122 such that the base station 12 is directed toward the aerial device 10 in a predetermined range when the second antenna module 122 receives the image data from the first antenna module 102 of the aerial device 10.

Moreover, as shown in FIG. 2, the aerial device 10 of the present embodiment further includes a position detecting module (not shown in the drawings), via which the aerial device 10 obtains a three-dimensional position information of the aerial device 10 and then transmits the three-dimensional position information as a first remote controlling signal to the base station 12 through the third antenna module 103. The three-dimensional position information includes longitude information, latitude information, and height information of the aerial device 10. Thereafter, the fourth antenna module 123 of the base station 12 receives the first remote controlling signal, i.e. the three-dimensional position information from the third antenna module 103, and the angle adjusting module 126 of the base station 12 adjusts the radiation direction of the second antenna module 122 in accordance with the first remote controlling signal.

More specifically, after the fourth antenna module 123 receives the first remote controlling signal, i.e. the three-dimensional position information of the aerial device 10 from the third antenna module 103, the control module 121 receives the first remote controlling signal from the fourth antenna module 123 and then controls the angle adjusting module 126 to adjust the radiation direction of the second antenna module 122 according to the three-dimensional position information of the aerial device 10 and the current position of the base station 12.

It should be noted that, although the aerial device 10 of the present embodiment includes the third antenna module 103, and the base station 12 of the present embodiment includes the fourth antenna module 123 such that signals at low frequencies, e.g. the first remote controlling signal of the aerial device 10, can be transmitted between the aerial device 10 and the base station 12, the present disclosure in not limited thereto. For instance, in other embodiments, the first remote controlling signal can also be transmitted between the aerial device 10 and the base station 12 using the first antenna module 102 and the second antenna module 122 at high frequencies.

As shown in FIG. 2, in the present embodiment, the angle adjusting module 126 includes an azimuth angle adjusting unit 126A and an elevation angle adjusting unit 126B. The azimuth angle adjusting unit 126A adjusts the azimuth angle of the second antenna module 122, and the elevation angle adjusting unit 126B adjusts the elevation angle thereof. In this way, the base station 12 is able to be directed toward the aerial device 10 via the angle adjusting module 126 when the second antenna module 122 is receiving the image data from the first antenna module 102 in the first frequency band of wide bandwidth and high transmission rate, achieving real-time data transmission at wide bandwidths and high transmission rate.

In the present embodiment, the base station 12 further includes an output module 125. The output module 125 is used for outputting the received image data to other electric devices (not shown). In the present embodiment, the output module 125 includes a wired communication module (not shown) and a wireless communication module (not shown), but is not limited thereto.

Figure 3:
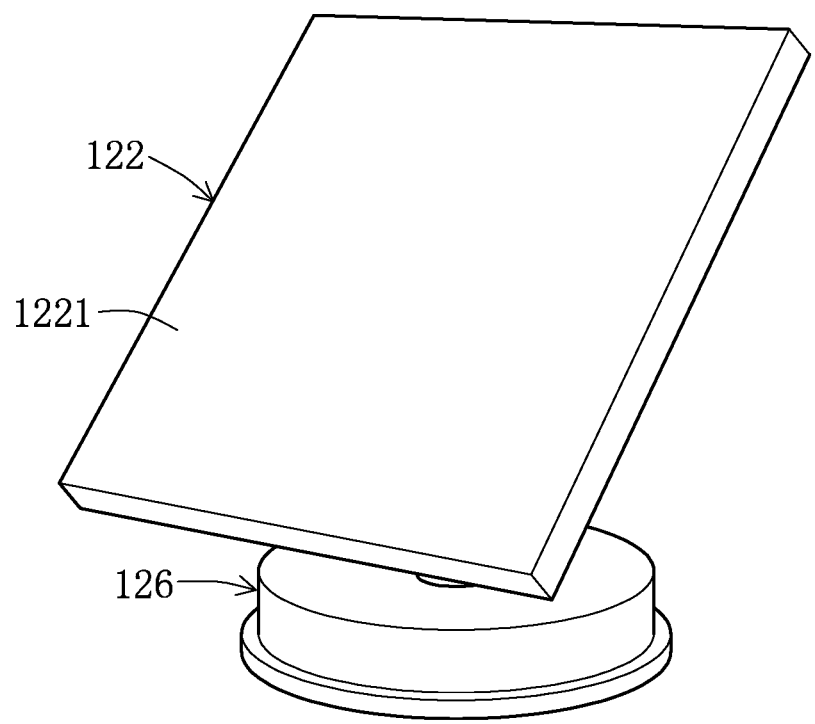
FIG. 3 is a schematic diagram of a base station according to the embodiment of the present disclosure.
Figure 4:
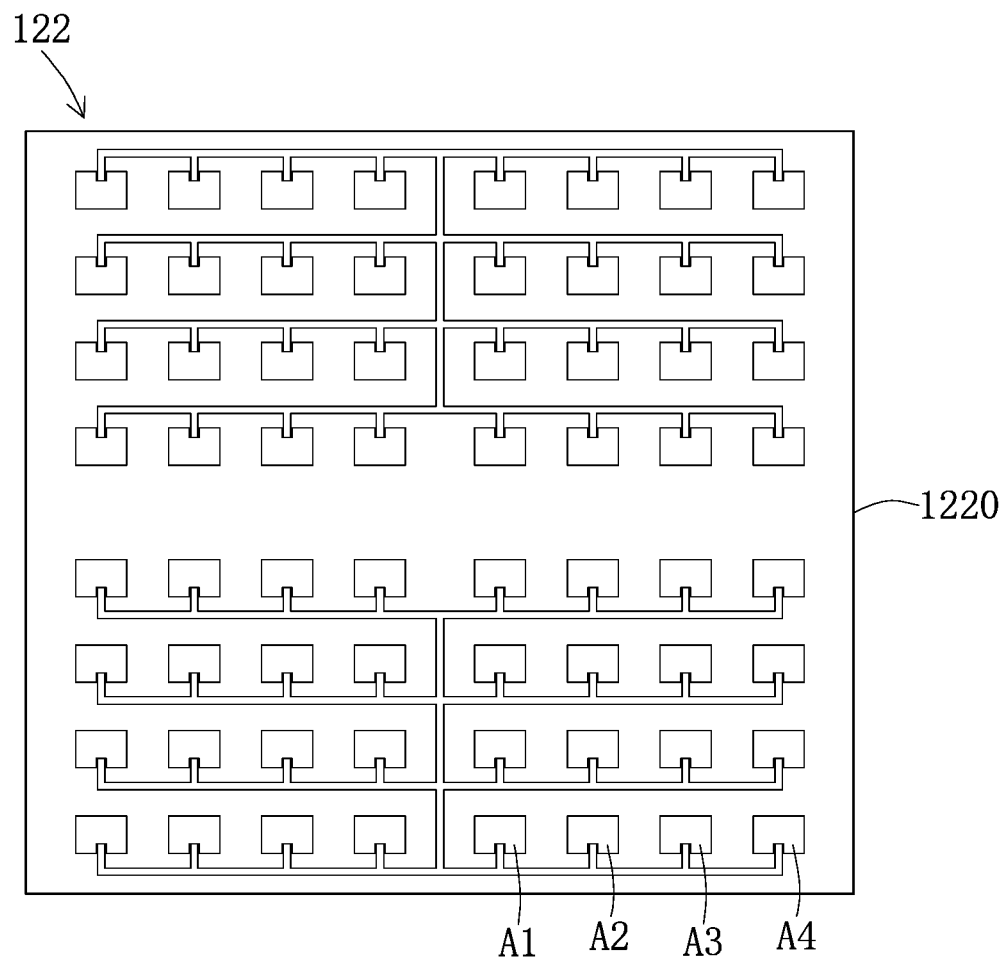
FIG. 4 is a schematic diagram of a second antenna module according to the embodiment of the present disclosure.
Figure 5:
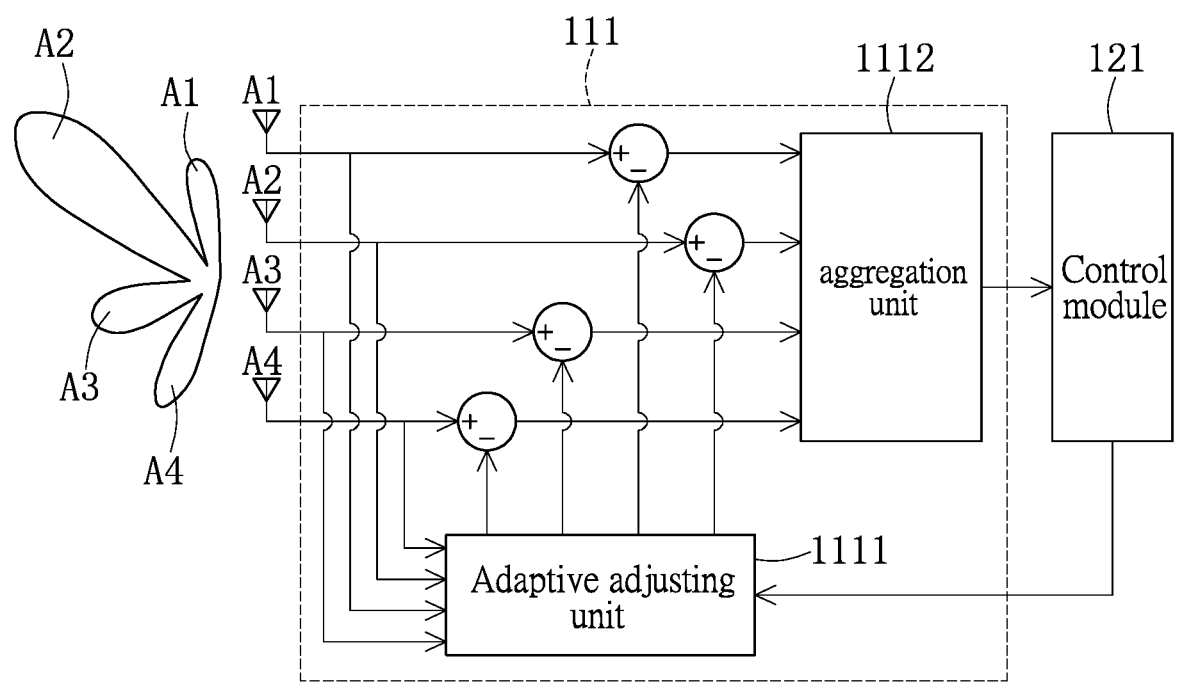
FIG. 5 is a schematic diagram of a control module and an adaptive adjusting module according to the embodiment of the present disclosure.

Reference is next made to FIG. 3, FIG. 4, and FIG. 5. FIG. 3 is a schematic diagram of a base station according to the present embodiment of the present disclosure. FIG. 4 is a schematic diagram of a second antenna according to the embodiment of the present disclosure. FIG. 5 is schematic diagram of a control module and an adaptive adjusting module according to the present embodiment of the present disclosure.

In this embodiment, the second antenna module 122 is a panel antenna including an antenna substrate 1220, a panel-shaped cover 1221 and a plurality of high frequency antenna units, with four of which being labelled as A1, A2, A3, A4 respectively in FIG. 4 for schematic purpose. The plurality of high frequency antenna units is mounted on the antenna substrate 1220, and the antenna substrate 1220 is disposed inside the panel-shaped cover 1221, which is further mounted on the angle adjusting module 126. It should be noted that the panel-shaped cover 1221 is not shown in FIG. 4 for the purpose of brief illustration.

The angle adjusting module 126 adjusts the azimuth angle and the elevation angle of the antenna substrate 1220 for adjusting the azimuth angle and the elevation angle of the second antenna module 122. In the embodiment, the azimuth angle adjusting unit 126A and the elevation angle adjusting unit 126B are stepping motors. In other embodiments, the azimuth angle adjusting unit 126A and the elevation angle adjusting unit 126B can be servo motors, but is not limited in the present disclosure.

Referring to FIG. 4, in this embodiment, a plurality of high frequency antenna units is mounted on the antenna substrate 1220 in array. In other embodiments, the antenna substrate 1220 can have an arced surface as the parabolic reflector (or parabolic dish) of a dish antenna. The arrangement of the second antenna units can be adjusted according to different embodiment types of the antenna substrate 1220. The shape of the antenna substrate 1220 and the arrangement of the second antenna units can be designed according to practical requirements, and is not limited in the present disclosure. With the aforementioned technical solutions, the second antenna module 122 can be exemplified as a directional antenna.

In the embodiment, the fourth antenna module 123 of the base station 12 continuously receives the three-dimensional position information of the aerial device 10 transmitted from the third antenna module 103 of the aerial device 10 so that the control module 121 records a trail of movement of the aerial device 10. The angle adjusting module 126 of the base station 12 then adjusts the second antenna module 122 in a manner such that the second antenna module 122 of the base station 12 is directed toward the aerial device 10 in a predetermined range according to the trail of movement of the aerial device 10. Namely, the angle adjusting module 126 of the base station 12 adjusts the azimuth angle and the elevation angle of the second antenna module 122 according to the trail of movement such that the second antenna module 122 is directed toward the aerial device 10.

Reference is made to FIG. 5, which is a schematic diagram of a control module and an adaptive adjusting module according to one embodiment of the present disclosure.

In this embodiment, the base station 12 further includes an adaptive adjusting module 111. The adaptive adjusting module 111 includes an adaptive adjusting unit 1111 and an aggregation unit 1112.

In the embodiment shown in FIG. 5, the second antenna module 122 includes a first high frequency antenna unit A1, a second high frequency antenna unit A2, a third high frequency antenna unit A3 and a fourth high frequency antenna unit A4. The strengths of the received signals from the first antenna module 102 depend on the pattern of arrangement of the high frequency antenna units A1-A4. In other words, the aggregated radiation pattern of the high frequency antenna units A1-A4 determines the strengths of the received signals. In this embodiment, the high frequency antenna units A1-A4 are electrically connected to the adaptive adjusting unit 1111 respectively. The adaptive adjusting unit 1111 adjusts the signals received by the high frequency antenna units A1-A4 according to the arranged positions of each of the high frequency antenna units A1-A4 and the signal strength of each received signal. Each of the adjusted signals received by the high frequency antenna units A1-A4 are aggregated with the signals originally received by the high frequency antenna units A1-A4. Finally, all of the aggregated signals of the high frequency antenna units A1-A4 are aggregated by the aggregation unit 1112, and the result is transmitted to the control module 121 as the three-dimensional position information of the aerial device 10.

The control module 121 transmits a three-dimensional adjusting signal to the angle adjusting module 126 according to the three-dimensional position information and the current position of the base station 12. The azimuth angle adjusting unit 126A and the elevation angle adjusting unit 126B respectively adjust the azimuth angle and the elevation angle of the second antenna module 122 accordingly. In this way, the second antenna module 122 can be directed toward the aerial device 10 in the predetermined range, with the tolerance of the angle between the second antenna module 122 and the aerial device 10 being restricted within a predetermined range, such as 5 degrees. In other words, when the second antenna module 122 is directed toward the aerial device 10 within the range of a 5 degree angle, the second antenna module 122 can receive the signals from the first antenna module 102 of the aerial device 10 with high transmission efficiency. In other embodiments, the predetermined range can be varied according to the performance of the first antenna module 102 of the aerial device 10 and that of the second antenna module 122 of the base station 12. The predetermined range of tolerance angle is not limited in the present disclosure.

In another embodiment of the present disclosure, the fourth antenna module 123 is further configured to transmit a second remote controlling signal to the third antenna module 103. To be specific, the second remote controlling signal includes a destination information of the aerial device 10, according to which the aerial device 10 moves from a current position to a destination position. That is to say, in addition to receiving a first remote controlling signal from the third antenna module 103 according to which the angle adjusting module 126 directs the base station toward the aerial device 10, the fourth antenna module 123 can transmit a second remote controlling signal, which contains the destination information of the aerial device 10 to the third antenna module 103 such that the aerial device 10 is controlled to move to a destination position accordingly.

According to the above, the first antenna module 102 of the aerial device 10 of the present disclosure is used for transmitting high-definition image signals to the base station 12 via the first frequency band with wide-bandwidth and high-speed transmission characteristics. The base station 12 can be directed toward the aerial device 10 according to the first remote controlling signal, e.g. the three-dimensional position information of the aerial device 10 sent from the third antenna module 103. In this way, the capacity of the storage device used in the camera 104 of the aerial device 10 can be reduced, and the image data taken by the camera 102 of the aerial device 10 can be transmitted, received and viewed instantly, thereby effectively saving time and equipment costs for the user. Furthermore, in the present embodiment, the base station 12 mainly includes the second antenna module 122 and the angle adjusting module 126, in which the second antenna module 122 is exemplified as a panel antenna, achieving the effect of high portability. With high portability of the base station 12, real-time data transmission at wide bandwidths and high transmission rate can be further realized with reduced space restriction.

The descriptions illustrated supra set forth simply the embodiments of the instant disclosure; however, the characteristics of the instant disclosure are by no means restricted thereto. All changes, alterations, or modifications conveniently considered by those skilled in the art are deemed to be encompassed within the scope of the instant disclosure delineated by the following claims.

What is claimed is:

1. A real-time data transmission system comprising: an aerial device including a first antenna module, the aerial device transmitting data in a frequency band with wide-bandwidth and high-speed transmission characteristics via the first antenna module; and a base station including a second antenna module configured to receive data from the first antenna module of the aerial device in the frequency band;
   wherein the radiation direction of the second antenna module is adjustable in accordance with the position of the aerial device;
   wherein the aerial device further includes a third antenna module, and the base station further includes a fourth antenna module receiving a first remote controlling signal from the third antenna module of the aerial device, and the first remote controlling signal of the aerial device is transmitted between the aerial device and the base station;

wherein an angle adjusting module of the base station adjusts the radiation direction of the second antenna module in accordance with the first remote controlling signal such that the base station is directed toward the aerial device in a predetermined range when the second antenna module receives data from the first antenna module of the aerial device.

2. The real-time data transmission system of claim 1, wherein the aerial device further includes a camera, the aerial device obtaining image data via the camera and transmitting the image data in the frequency band to the second antenna module of the base station via the first antenna module.

3. The real-time data transmission system of claim 1, wherein the first antenna module of the aerial device further transmits the first remote controlling signal to the second antenna module such that the second antenna module is directed toward the first antenna module of the aerial device.

4. The real-time data transmission system of claim 1, wherein the second antenna module is a panel antenna including a panel-shaped cover, an antenna substrate disposed inside the panel-shaped cover, and a plurality of high frequency antenna units disposed on the antenna substrate.

5. The real-time data transmission system of claim 1, wherein the second antenna module is a directional antenna.

6. The real-time data transmission system of claim 1, wherein the frequency band with wide-bandwidth and high-speed transmission characteristics is at microwave frequencies or millimeter frequencies.

7. The real-time data transmission system of claim 1, wherein the angle adjusting module is connected to the second antenna module and configured to adjust a radiation direction of the second antenna module such that the base station is directed toward the aerial device in a predetermined range when the second antenna module receives data from the first antenna module of the aerial device.

8. The real-time data transmission system of claim 7, wherein the angle adjusting module includes:
an azimuth angle adjusting unit adjusting an azimuth angle of the second antenna module; and
an elevation angle adjusting unit adjusting an elevation angle of the second antenna module.

9. The real-time data transmission system of claim 1, wherein the first remote controlling signal is a three-dimensional position information of the aerial device, and the base station further includes:
a position detecting module detecting a current position of the base station; and
a control module in signal connection with the second antenna module, the fourth antenna module, the angle adjusting module and the position detecting module;
wherein the control module controls the angle adjusting module to adjust the radiation direction of the second antenna module according to the three-dimensional position information transmitted from the first low frequency antenna of the aerial device and the current position of the base station.

10. The real-time data transmission system of claim 9, wherein the three-dimensional position information includes longitude information, latitude information, and height information of the aerial device.

11. The real-time data transmission system of claim 9, wherein the control module records a trail of movement of the aerial device according to the three-dimensional position information transmitted from the first antenna, and controls the second antenna module of the base station to be directed toward the aerial device in the predetermined range according to the trail of movement of the aerial device.

12. The real-time data transmission system of claim 1, wherein the fourth antenna module is further configured to transmit a second remote controlling signal to the third antenna module, wherein the second remote controlling signal includes a destination information of the aerial device, according to which the aerial device moves from a current position to a destination position.

13. A real-time data transmission system comprising:
an aerial device including a first antenna module, the aerial device transmitting data in a frequency band with wide-bandwidth and high-speed transmission characteristics via the first antenna module; and
a base station including a second antenna module configured to receive data from the first antenna module of the aerial device in the frequency band;
wherein the radiation direction of the second antenna module is adjustable in accordance with the position of the aerial device;
wherein the base station further includes a control module, an adaptive adjusting module, the adaptive adjusting module includes an adaptive adjusting unit and an aggregation unit, the second antenna module includes a plurality of high frequency antenna units, and the plurality of high frequency antenna units are electrically connected to the adaptive adjusting unit;
wherein the adaptive adjusting unit adjusts the signals received by the plurality of high frequency antenna units of the second antenna module according to arranged positions of each of the high frequency antenna units and signal strength of each of the signals received by the plurality of high frequency antenna units of the second antenna module, each of the adjusted signals generated by the adaptive adjusting unit are aggregated with the signals originally received by the high frequency antenna units, all of the aggregated signals of the plurality of high frequency antenna units of the second antenna module are aggregated by the aggregation unit, and a result of the aggregation unit is transmitted to the control module as the three-dimensional position information of the aerial device.

* * * * *